(12) United States Patent
Gao et al.

(10) Patent No.: US 12,573,135 B2
(45) Date of Patent: Mar. 10, 2026

(54) GENERATION OF A DENSE POINT CLOUD OF A PHYSICAL OBJECT

(71) Applicant: Telefonaktiebolaget LM Ericsson (publ), Stockholm (SE)

(72) Inventors: Jiangning Gao, Solna (SE); Fengkai Wan, Bromma (SE); Rerngvit Yanggratoke, Järfälla (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 165 days.

(21) Appl. No.: 18/292,970

(22) PCT Filed: Sep. 28, 2021

(86) PCT No.: PCT/EP2021/076665
§ 371 (c)(1),
(2) Date: Jan. 29, 2024

(87) PCT Pub. No.: WO2023/051896
PCT Pub. Date: Apr. 6, 2023

(65) Prior Publication Data
US 2025/0095285 A1        Mar. 20, 2025

(51) Int. Cl.
*G06T 17/00*        (2006.01)
(52) U.S. Cl.
CPC .................................... *G06T 17/00* (2013.01)
(58) Field of Classification Search
CPC ........... G06T 2207/10028; G06T 17/00; G06T 19/20; G06T 19/003; G06T 2207/20081; G06T 2200/08; G06T 7/50; G06T 2207/20221; G06T 7/60; G06T 7/194; G06T 2207/10004; G06T 2207/20016; G06F 16/587; G06F 9/5066
See application file for complete search history.

(56) References Cited

U.S. PATENT DOCUMENTS

| | | | |
|---|---|---|---|
| 11,216,663 B1 * | 1/2022 | Ettinger | ............... G05D 1/0016 |
| 2017/0085863 A1 * | 3/2017 | Lopez | .................. H04N 13/261 |
| 2019/0138786 A1 * | 5/2019 | Trenholm | ............. G06F 18/241 |
| 2020/0184651 A1 * | 6/2020 | Mukasa | ................. G06T 7/194 |

(Continued)

OTHER PUBLICATIONS

International Search Report and Written Opinion of the International Searching Authority, PCT/EP2021/076665, mailed Jun. 9, 2022, 14 pages.

(Continued)

*Primary Examiner* — Hau H Nguyen
(74) *Attorney, Agent, or Firm* — Sage Patent Group

(57)        ABSTRACT

A dense point cloud (DPC) is generated for a physical object. 2D digital images of the physical object are obtained. Object extractors are defined. A sparse point cloud (SPC) is created from the 2D digital images. A modified SPC is obtained by first applying the object extractors to the 2D digital images to exclude pixels from the 2D digital images and then excluding the datapoints in the SPC that correspond to the pixels that have been excluded from the 2D digital images. The datapoints of the SPC that do not represent the object are excluded from being included in the modified SPC. The DPC is generated by integrating information obtained from the pixels in the 2D digital images with the modified SPC.

13 Claims, 6 Drawing Sheets

(56) References Cited

U.S. PATENT DOCUMENTS

2020/0320727 A1 * 10/2020 Smolic .................... G06T 15/08

OTHER PUBLICATIONS

Luo, Nan et al., "An Improved Algorithm Robust in Illumination Variations for Reconstructing Point Cloud Models from Images," Remote Sensing, vol. 13, No. 4, Feb. 5, 2021, 21 pages.

Diller, Christian, "3D Shape Completion from Sparse Point Clouds Using Deep Learning," Master's Thesis in Infomatics, München Technische Universität, Jul. 15, 2019, 60 pages.

Guo, Yulan et al., "Deep Learning for 3D Point Clouds: A Survey," IEEE Transactions on Pattern Analysis and Machine Intelligence, vol. 43, No. 12, Dec. 2021, 27 pages.

Ming, Yue et al., "Deep Learning for Monocular Depth Estimation: A Review," Neurocomputing, vol. 438, May 28, 2021, 22 pages.

* cited by examiner (a)

110

(b)

120

(c)

130

(a)

220a-1 210-1 230-1 220b-1

(b)

220a-2

230-2

220b-2

210-2

GENERATION OF A DENSE POINT CLOUD OF A PHYSICAL OBJECT

CROSS REFERENCE TO RELATED APPLICATIONS

This application is a 35 U.S.C. § 371 national stage application of PCT International Application No. PCT/EP2021/076665 filed on Sep. 28, 2021, the disclosure and content of which is incorporated by reference herein in its entirety.

TECHNICAL FIELD

Embodiments presented herein relate to a method, an image processing device, a computer program, and a computer program product for generating a dense point cloud of a physical object.

BACKGROUND

Within the technical field of digital imaging, a point cloud can, in general terms, be regarded as a set of data points in space. The points represent a three-dimensional (3D) shape or object. Hereinafter it will be assumed that the point cloud represents a physical object. Dense point clouds (DPCs) are point clouds with comparably higher number of data points than sparse point clouds (SPCs), yielding high resolution of the physical object. Each data point in the point cloud has a set of coordinates in 3D space. DPCs as considered by the present disclosure are generally produced by photogrammetry software, which would reconstruct many data points on the external surfaces of the physical object.

As the output of 3D scanning processes, DPCs are used for many purposes, including to create 3D computer aided design (CAD) models for manufactured parts, for metrology and quality inspection, and for a multitude of visualization, animation, rendering and mass customization applications. One non-limiting benefit of using DPCs will be described for illustrative purposes. FIG. 1 at (a), (b), and (c) schematically illustrates different views 110, 120, 130, taken from different types of orbits, of a telecommunication site, commonly referred to as a base station. For illustrative purposes, assume that a comparison is to be made between the actual telecommunication site and schematics of the telecommunication site. One way to achieve this is to generate one or more DPCs of the telecommunication site and then compare the one or more DPCs to the schematics. The comparison between the one or more DPCs and the schematics typically involves extracting features of the telecommunication site from the one or more DPCs and comparing the extracted features to the corresponding features in the schematics. Without the use of DPCs, this process would have involved a human operator, technician, or engineer, performing a survey, involving a site visit, or even climbing up the physical structure of the site, in order to create a detailed site drawing. Once drawn, the site drawing could be compared to the schematics. This process is tedious and expensive, as well as potentially dangerous as the human operator needs to climb the physical structure.

Existing software available for 3D reconstruction from 2D digital images enables creation of point clouds (PCs) of the whole scene, e.g., a cell tower and its surrounding environment. The typical outcome of such software is an SPC, i.e., a data structure representing the physical objects in 3D space but with less detail than the DPC. Traditional 3D reconstruction often results in irrelevant objects (or objects not of interest) being included in the target domain (such as the surrounding area of the telecommunication site, e.g., buildings, trees, and grounds). This could sometimes be an issue. Two known approaches to handle this issue will be disclosed next.

One approach is to simply ignore the issue, i.e., to not address the issue at all. This could result in irrelevant objects (or objects not of interest) being considered by the photogrammetry software, possibly resulting in difficulties in extracting matching points during feature extraction for reconstruction of the PCs. Therefore, the resulting PCs might have lower resolutions and miss more fine physical details of the target physical objects due to the number of matching data points being reduced.

Another approach to address this issue is to apply bounding boxes on the 2D digital images (during the feature extractions) prior to the 3D reconstruction. The purpose of the bounding boxes is to roughly indicate the target area where the physical object is assumed to be located during feature extraction for reconstruction. The bounding boxes could typically be represented by binary masks. Two examples of such binary masks 210-1, 210-2 are shown in FIG. 2 at (a) and (b). The binary masks 210-1, 210-2 would filter out information outside the target areas 230-1, 230-2. This is achieved by in each binary mask 230-1, 230-2 having two exclusion zones 220$a$-1, 220$a$-2, 220$b$-1, 220$b$-2. When the binary masks 230-1, 230-2 are applied, values that are filtered with any exclusion zone 220$a$-1, 220$a$-2, 220$b$-1, 220$b$-2 are nulled and thereby excluded from further processing. In FIG. 2($a$) the exclusion zones 220$a$-1, 220$b$-1 are located at the vertical edges and in FIG. 2($b$) the exclusion zones 220$a$-2, 220$b$-2 are located at the horizontal edges. Compared to the first approach to address this issue, the resolution of the data points relevant for the target physical object might be increased by the use of bounding boxes, since some irrelevant objects might be removed. However, this approach could yield highly undesired effects as distortion of scales in the reconstructed DPCs, compared to the ground-truth scale. One reason for this is that the estimation of camera poses (e.g., using a structure from motion algorithm) cannot operate reliably due to missing data points, as excluded by application of the bounding boxes. In particular, the resulted DPCs may no longer represent the real-world physical object. This severely limits the usefulness of the resulting DPCs.

Hence, there is still a need for an improved generation of DPCs.

SUMMARY

An object of embodiments herein is to address the above issues by providing efficient generation of DPCs.

According to a first aspect there is presented a method for generating a DPC of a physical object. The method is performed by an image processing device. The method comprises obtaining 2D digital images of the physical object. Each 2D digital image is comprised of pixels. Some, but not all the pixels in each of the 2D digital images, represent the physical object. The method comprises defining object extractors. The object extractors are defined to separate a first set of the pixels in the 2D digital images representing the physical object from a second set of the pixels in the 2D digital images not representing the physical object. The method comprises creating an SPC from the 2D digital images. The SPC is comprised of datapoints. Some, but not all the datapoints, represent the physical object. The method comprises obtaining a modified SPC from the SPC by first applying the object extractors to the 2D digital images to exclude pixels from the 2D digital images and then excluding the datapoints in the SPC that correspond to the pixels that have been excluded from the 2D digital images. The datapoints in the SPC that do not represent the object are excluded from being included in the modified SPC. The method comprises generating the DPC by integrating information obtained from the pixels in the 2D digital images with the modified SPC.

According to a second aspect there is presented an image processing device for generating a DPC of a physical object. The image processing device comprises processing circuitry. The processing circuitry is configured to cause the image processing device to obtain 2D digital images of the physical object. Each 2D digital image is comprised of pixels. Some, but not all the pixels in each of the 2D digital images, represent the physical object. The processing circuitry is configured to cause the image processing device to define object extractors. The object extractors are defined to separate a first set of the pixels in the 2D digital images representing the physical object from a second set of the pixels in the 2D digital images not representing the physical object. The processing circuitry is configured to cause the image processing device to create an SPC from the 2D digital images. The SPC is comprised of datapoints. Some, but not all the datapoints, represent the physical object. The processing circuitry is configured to cause the image processing device to obtain a modified SPC from the SPC by first applying the object extractors to the 2D digital images to exclude pixels from the 2D digital images and then excluding the datapoints in the SPC that correspond to the pixels that have been excluded from the 2D digital images. The datapoints of the SPC that do not represent the object are excluded from being included in the modified SPC. The processing circuitry is configured to cause the image processing device to generate the DPC by integrating information obtained from the pixels in the 2D digital images with the modified SPC.

According to a third aspect there is presented an image processing device for generating a DPC of a physical object. The image processing device comprises an obtain module configured to obtain 2D digital images of the physical object. Each 2D digital image is comprised of pixels. Some, but not all the pixels in each of the 2D digital images, represent the physical object. The image processing device comprises a define module configured to define object extractors. The object extractors are defined to separate a first set of the pixels in the 2D digital images representing the physical object from a second set of the pixels in the 2D digital images not representing the physical object. The image processing device comprises a create module configured to create an SPC from the 2D digital images. The SPC is comprised of datapoints. Some, but not all the datapoints, represent the physical object. The image processing device comprises an obtain module configured to obtain a modified SPC by first applying the object extractors to the 2D digital images to exclude pixels from the 2D digital images and then excluding the datapoints in the SPC that correspond to the pixels that have been excluded from the 2D digital images. The datapoints of the SPC that do not represent the object are excluded from being included in the modified SPC. The image processing device comprises a generate module configured to generate the DPC by integrating information obtained from the pixels in the 2D digital images with the modified SPC.

According to a fourth aspect there is presented a system. The system comprises an image processing device according to the second or third aspect and an image capturing unit configured to capture the 2D digital images.

According to a fifth aspect there is presented a computer program for generating a DPC of a physical object, the computer program comprising computer program code which, when run on an image processing device, causes the image processing device to perform a method according to the first aspect.

According to a sixth aspect there is presented a computer program product comprising a computer program according to the fifth aspect and a computer readable storage medium on which the computer program is stored. The computer readable storage medium could be a non-transitory computer readable storage medium.

Advantageously, these aspects provide efficient generation of DPCs without suffering from the above issues.

Advantageously, since irrelevant objects (or objects not of interest) are excluded from the SPC, the time needed to create the DPC, as well as the storage space for the DPC can be significantly reduced. This is achieved by the herein disclosed aspects enabling avoidance of processing and/or storing of irrelevant objects (or objects not of interest). In some examples, the proposed generation of DPCs is 15-30% faster than the approaches mentioned above. In some examples, the proposed generation of DPCs require 20-40% lower amount of storage than the approaches mentioned above.

Advantageously, these aspects provide DPCs with higher quality in terms of resolutions and coverage of details in the physical objects than the approaches mentioned above. In some examples, the resolution can be improved by 30-70%.

Advantageously, these aspects enable DPCs to be generated without unexpected distortion whilst preserving all dimensions for measurements.

Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, module, step, etc." are to be interpreted openly as referring to at least one instance of the element, apparatus, component, means, module, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

As noted above there is still a need for an improved generation of DPCs.

The embodiments disclosed herein therefore relate to mechanisms for generating a DPC of a physical object. In order to obtain such mechanisms there is provided an image processing device 600, a method performed by the image processing device 600, a computer program product comprising code, for example in the form of a computer program, that when run on an image processing device 600, causes the image processing device 600 to perform the method.

At least some of the herein disclosed embodiments address the need for an improved generation of DPCs by enabling target-aware PCs to be reconstructed from 2D digital images. By target-aware is referred to a technique that enables only a representation of the intended physical objects to be included in the PCs. This enables high-quality PCs in terms of high density and coverage of details of the physical objects of interest to be generated. According to at least some embodiments, this is achieved by identifying the physical objects in each 2D digital image, filtering out data points outside of the physical objects in the SPC, and then integrating the results into the DPCs.

Figure 1:
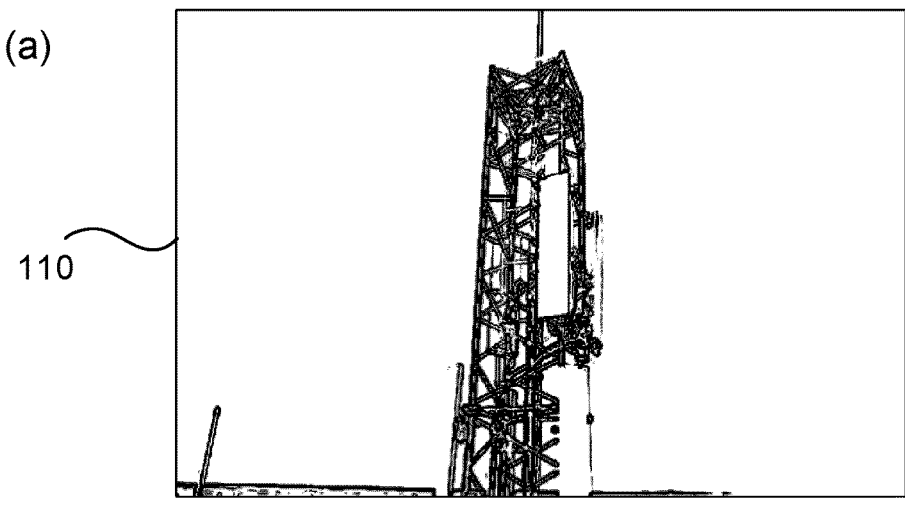
FIG. 1 schematically illustrates different views of a telecommunication site.
Figure 1:
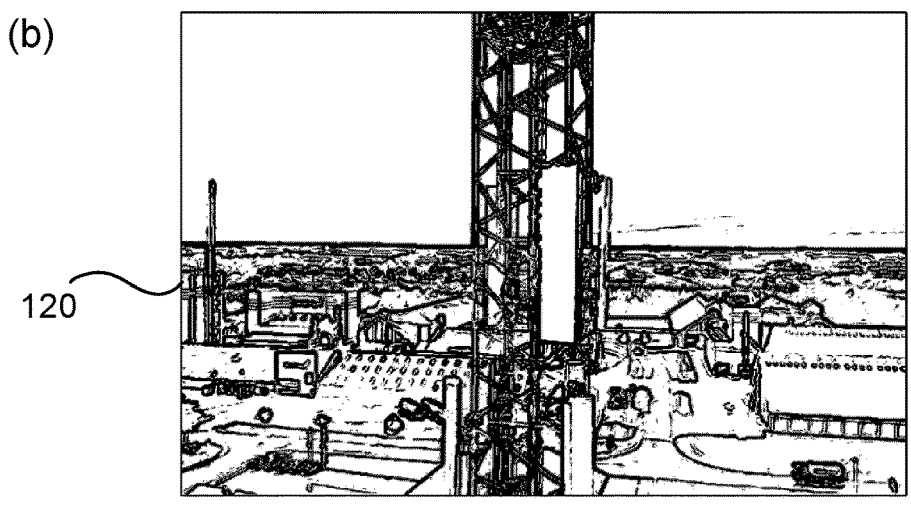
Figure 1:
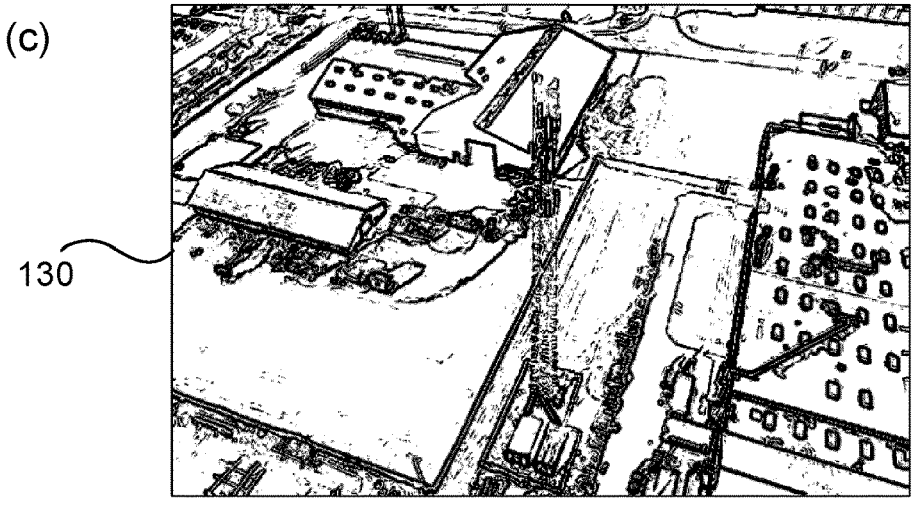
Figure 2:
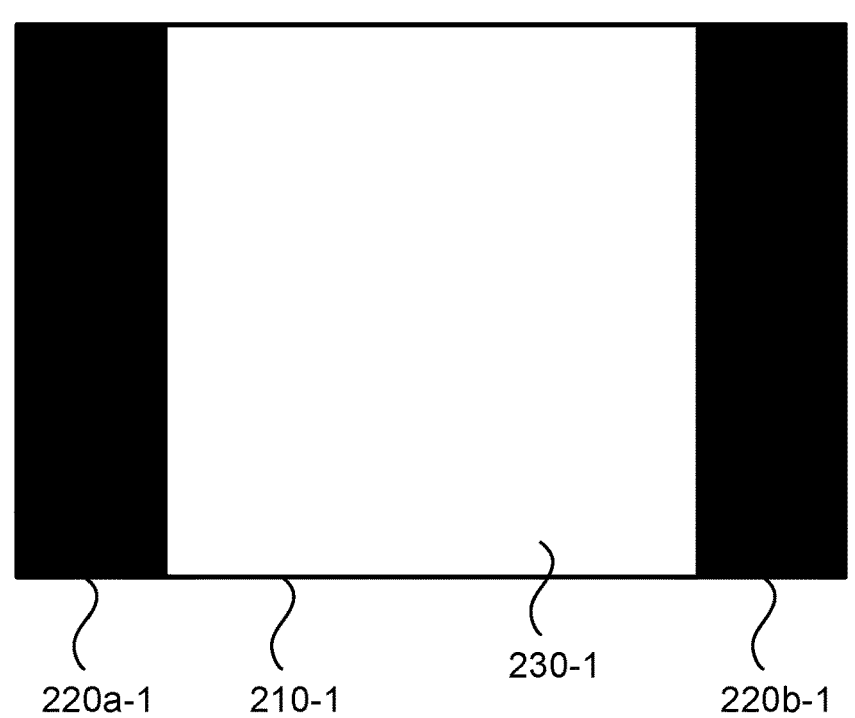
FIG. 2 schematically illustrates two examples of binary masks.
Figure 2:
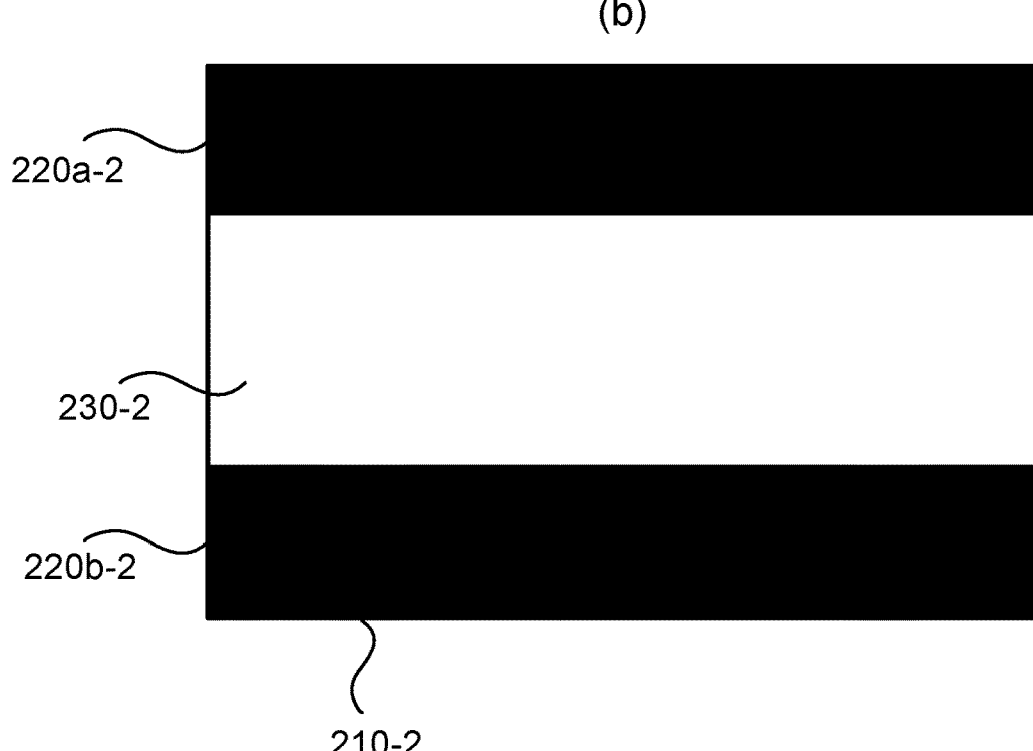
Figure 3:
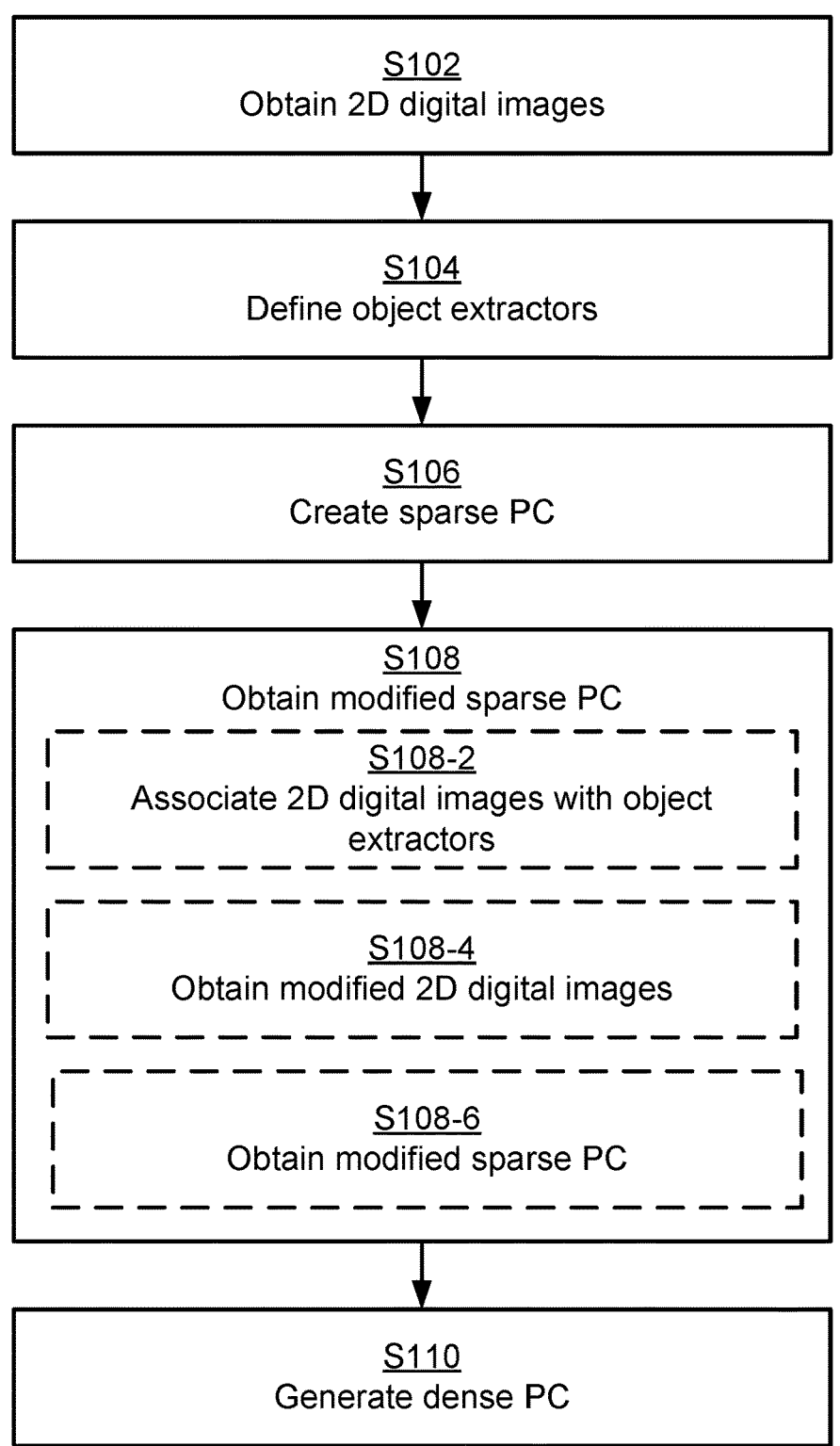
FIG. 3 and FIG. 5 are flowcharts of methods according to embodiments.

FIG. 3 is a flowchart illustrating embodiments of methods for generating a DPC of a physical object. The methods are performed by the image processing device 600. The methods are advantageously provided as computer programs 920.

S102: The image processing device 600 obtains 2D digital images of the physical object. Each 2D digital image is comprised of pixels. Some, but not all the pixels in each of the 2D digital images, represent the physical object.

S104: The image processing device 600 defines object extractors. The object extractors are defined to separate a first set of the pixels in the 2D digital images representing the physical object from a second set of the pixels in the 2D digital images not representing the physical object. Further aspects of how the object extractors might be defined will be disclosed below.

Thus, the second set of the pixels in the 2D digital images represent irrelevant objects (or objects not of interest).

S106: The image processing device 600 creates an SPC from the 2D digital images. The SPC is comprised of datapoints. Some, but not all the datapoints, represent the physical object.

S108: The image processing device 600 obtains a modified SPC by first applying the object extractors to the 2D digital images to exclude pixels from the 2D digital images and then excluding the datapoints in the SPC that correspond to the pixels that have been excluded from the 2D digital images. The datapoints of the SPC that do not represent the object are excluded from being included in the modified SPC. Further aspects of how the modified SPC might be obtained will be disclosed below.

Thus, according to S108, the object extractors are applied to the 2D digital images to exclude pixels in the 2D digital images. The datapoints in the SPC that correspond to the pixels having been excluded from the 2D digital images are excluded from the SPC. The result of this is a modified SPC.

Thus, the modified SPC is identical to the SPC created in S106, except that some of the datapoints in the SPC created in S106, namely those datapoints of the SPC that do not represent the object, are excluded. In some aspects, the modified SPC can thus be regarded as a filtered version of the SPC created in S106 (but where the filter is actually applied to the 2D digital images and not directly to the SPC).

The modified SPC is now used instead of the SPC created in S106 for generating the DPC.

S110: The image processing device 600 generates the DPC by integrating information obtained from the pixels in the 2D digital images with the modified SPC. Further aspects of how the DPC might be generated will be disclosed below.

This method yields high quality DPCs (in respect to the physical objects), significantly reducing the processing time needed for generating the DPCs and the storage space for storing the DPCs. This is achieved by avoiding processing and/or storing of data points representing irrelevant physical objects.

Embodiments relating to further details for generating a DPC of a physical object as performed by the image processing device 600 will now be disclosed.

In some non-limiting examples, the physical object is a piece of telecommunications equipment, a part of a cell site, or even a complete cell site. In some non-limiting examples, the physical object is a building, or part of a building, such as a balcony.

There may be different ways to exclude the datapoints in S108. In some aspects, the datapoints of the SPC that are excluded are nulled. In particular embodiments, each datapoint has a value, and the values of the datapoints of the SPC that are excluded are nulled.

Figure 4:
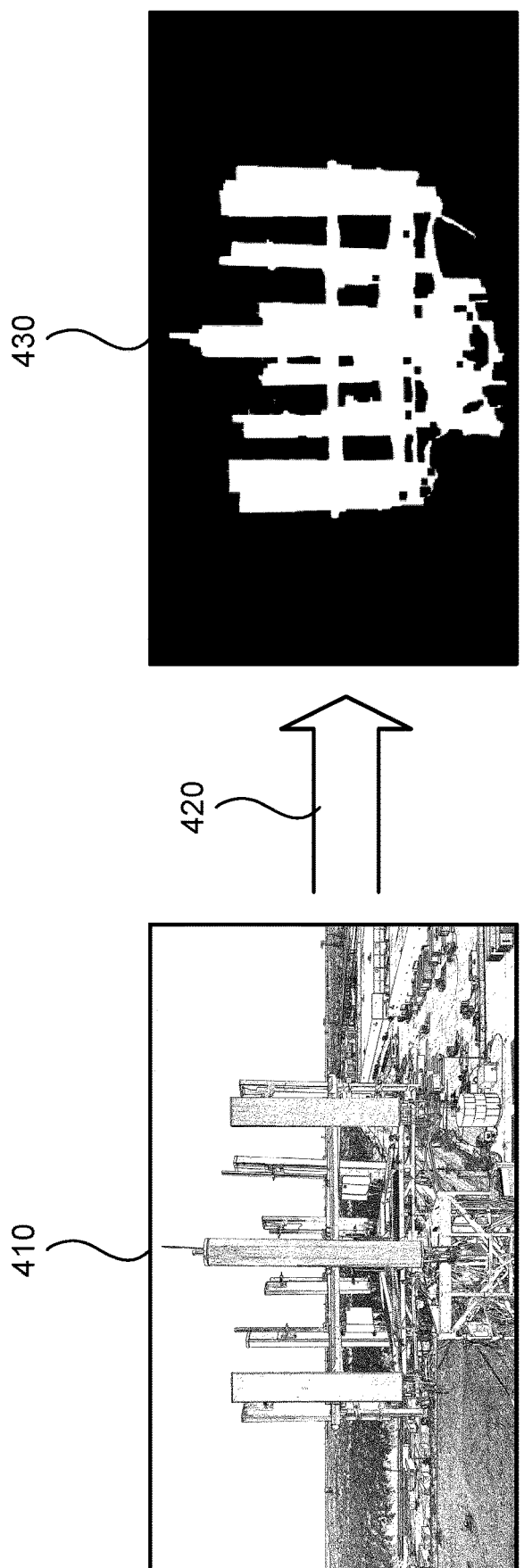
FIG. 4 schematically illustrates building an object extractor according to embodiments.

Aspects of the object extractors will now be disclosed. As disclosed above, the object extractors are defined to separate a first set of the pixels in the 2D digital images representing the physical object from a second set of the pixels in the 2D digital images not representing the physical object (as in S104). In general terms, the input to the object extractors is the 2D digital images, and the output is a data structure that defines the object extractor for each 2D digital image. FIG. 4 shows an illustrative example of a 2D digital image 410 depicting a physical object of interest in the form of part of a telecommunication site. A process, as represented by arrow 420, is applied to build an object extractor in the form of a binary mask 430. The binary mask 430 is built to correspond to the physical object of interest, i.e., to the telecommunication site depicted in the 2D digital image 410. That is, in some embodiments, each object extractor is represented by a respective binary mask. Two embodiments of how to build object extractors will now be disclosed.

According to a first embodiment, the object extractors are defined by depth maps created from the 2D digital images. The pixels in the 2D digital images representing the physical object are separated from pixels in the 2D digital images not representing the physical object by a threshold depth value in the depth maps. In more details, for this embodiment, a two-stage 3D reconstruction technique can be applied according to the following. First, any process can be applied that generates depth maps of the 2D digital images. One example of such a process is a standard 3D reconstruction process that can be executed to the dense reconstruction modelling part. Depth maps are thus created for each of the 2D digital images. Second, from the depth maps, a threshold value can be applied to exclude depth values above the threshold value. This would exclude pixels representing in irrelevant objects (or objects not of interest), yielding one approximate binary mask for each 2D digital image. The binary masks then define the object extractors. The object extractors can be enhanced by applying morphological operations in computer vision techniques, e.g., erosion and dilation. The object extractors can then be applied to the SPCs (as in S108) before the DPCs are actually generated (as in S110).

According to a second embodiment, the object extractors are defined by configuring a machine learning training procedure. In more details, for this embodiment, the object extractors could be developed using deep learning, e.g., RGB salient object detection. First, 2D digital images of different physical objects are separated into different training sets (one per physical object) and test sets (for evaluation of final performance). Then, for each training set, the procedure of the first embodiment is executed so as to obtain object extractors for each 2D digital image. The object extractors and the corresponding 2D digital images are then used to train a mask generator. In this respect, the mask generator can be trained using a machine learning model, whereby an exemplified training process is as follows. First, input pairs of 2D digital images and their corresponding object extractors (obtained from the previous step) are put into a centralized location (e.g., the same physical or virtual machine). Second, the data (i.e., input pairs) is separated into three parts; training, validation, and test sets. Third, a training code, e.g., using neural architecture based on convolution neural networks, could be executed on the training set and continuously evaluated on the validation set after each epoch. Fourth, the training process should continue until a certain stop criterion is met, e.g., the loss function on a validation set is below a threshold value or a certain number of epochs has been reached. Such a process could be executed on a device with a Graphics Processing Unit (GPU) accelerator. Lastly, the trained machine learning model could be executed and evaluated on the test set.

The two embodiments have different technical tradeoffs with respect to execution time and accuracy. The first embodiment might result in more accurate object extractors, since the object extractors are obtained directly from 2D digital images of a specific physical object. The first embodiment might have the potential disadvantage of requiring two 3D reconstruction processes, which would require longer time for execution. On the contrary, the second embodiment (after the masked detector model is trained) might require less processing time for execution. The second embodiment might not yield as accurate object extractors as the first embodiment.

Further details of how to obtain the modified SPC in S108 will now be disclosed. In general terms, the SPC can be mapped to 2D digital images, then object extractors are applied to the 2D digital images to filter out datapoints, and then the 2D digital images might be projected back to 3D space to update the SPC, resulting in a modified SPC. In particular, according to some embodiments, the image processing device 600 is configured to perform (optional) steps S108-2, S108-4, S108-8 as part of obtaining the modified SPC in S108:

S108-2: The image processing device 600 associates each 2D digital image with a respective one of the object extractors.

S108-4: The image processing device 600 obtains modified 2D digital images by applying each object extractor to its associated 2D digital image. The pixels of the 2D digital images that do not represent the physical object are excluded.

S108-6: The image processing device 600 obtains the modified SPC from the modified 2D digital images by excluding the datapoints in the SPC that correspond to the pixels having been excluded from the 2D digital images.

In general terms, each pixel has a value, and the values of the pixels of the 2D digital images that are excluded are nulled.

The DPCs could be generated from 2D digital images as captured of the physical object. In some non-limiting examples, the 2D digital images are captures from an image capturing unit mounted on an unmanned aerial vehicle (UAV). In general terms, 2D digital images could be captured from various orbits to enable DPCs to be generated from which the physical object can be reconstructed with fine details. Each of the 2D digital images might comprise exchangeable image file format (EXIF) information. This enables the SPCs and the DPCs to be generated based on the EXIF information. EXIF information in terms of positioning information, camera settings, temporal information, etc. can be used when generating the SPCs and the DPCs. Further, the DPCs might be generated using a 3D reconstruction software, such as COLMAP, Pix4D, or the like. These methods can be used to recover a sparse reconstruction of the scene depicting the physical object and camera poses of the input 2D digital images. The resulting output can be used as the input to multi-view stereo processing to recover a denser reconstruction of the scene.

Figure 5:
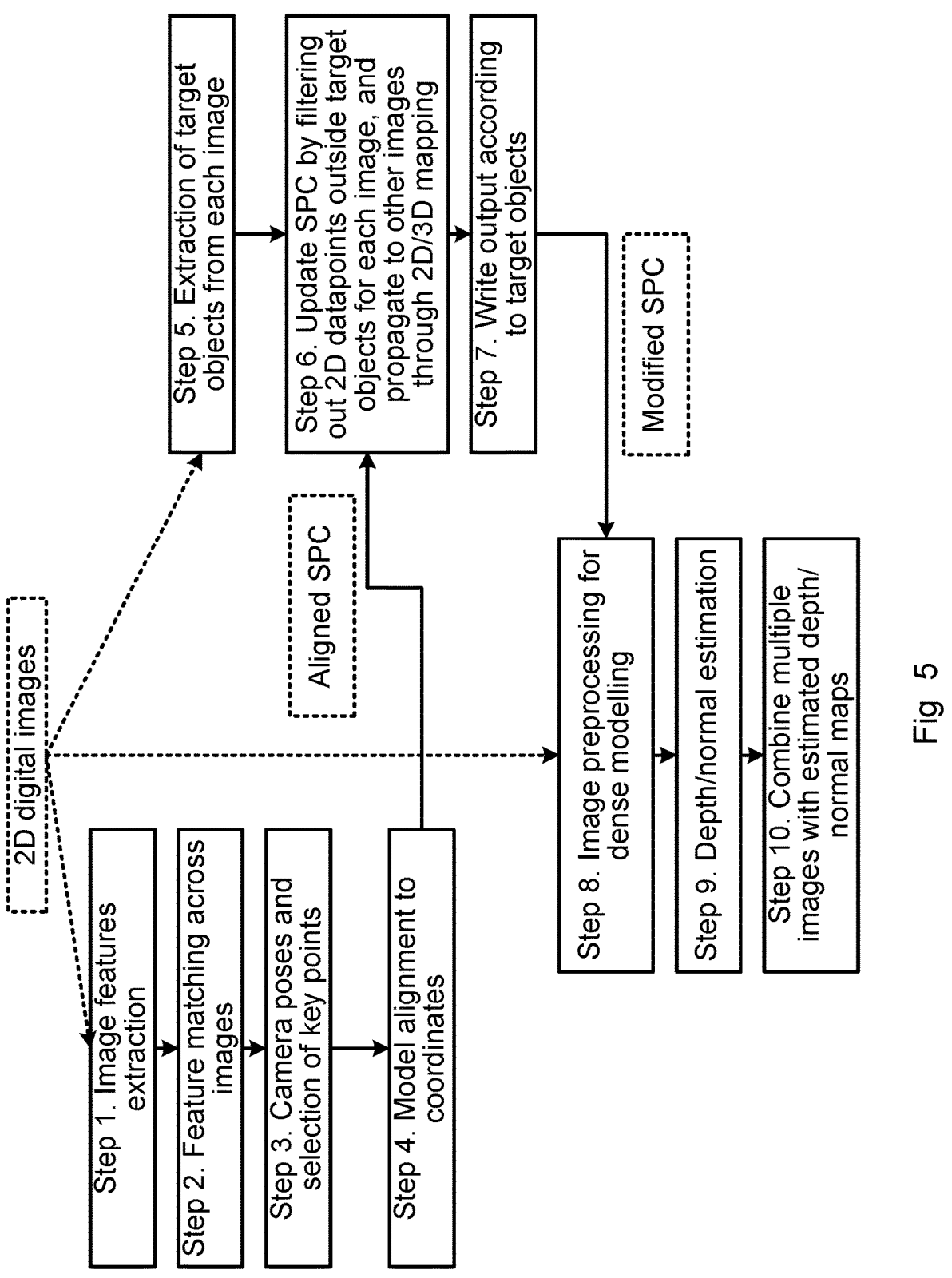

One particular embodiment for generating a DPC of a physical object as performed by the image processing device 600 based on at least some of the above disclosed embodiments will now be presented with reference to the flowchart of FIG. 5. In general terms, the flowchart can be divided into five stages; a data association stage (comprising steps 1 and 2) for extracting features from each 2D digital image, a sparse modelling stage (comprising steps 3 and 4) for construction of SPCs, a target-aware modelling stage (comprising step 5) for building object extractors, a filtering stage (comprising steps 6 and 7) for applying the object extractors, and a dense modelling stage (comprising steps 8, 9 and 10) for generating the DPCs.

Aspects of the data association stage will now be disclosed. In Step 1 and Step 2, all features used for generation of the SPC are extracted from 2D digital images provided as input to Step 1. The detected features are matched across the 2D digital images. A 2D feature extraction algorithm, e.g., scale-invariant feature transform (SIFT), is first applied to all 2D digital images in Step 1. Then, in Step 2 a feature matching algorithm, e.g., exhaustive matcher, is used to find all the matched points/features from each used 2D digital images. In Step 2, 2D digital images without matching features are excluded.

Aspects of the sparse modelling stage will now be disclosed. In Step 3 and Step 4, a sparse reconstruction, in the representation of an SPC, of the scene and camera poses of the 2D digital images are recovered by using structure from motion (SfM). SfM is a technique for estimating 3D structures from 2D image sequences. In Step 4 location information, such as information in terms of spatial coordinates from a Global Positioning System (GPS) associated with the 2D digital images is used to align the PCs to form the SPC. The output of Step 4 is thus an aligned SPC.

Aspects of the target-aware modelling stage will now be disclosed. In Step 5, one respective target object extractor is built based on extraction of pixels representing the physical object of interest in each used 2D digital image.

Aspects of the filtering stage will now be disclosed. Input to Step 6 is the aligned SPC and the object extractors. In Step 6, the object extractors are used to filter the outputs of the sparse modelling stage (i.e., the output of Step 4), where the output is written to generate a new (or modified) SPC in Step 7. In more detail, based on the object extractors, the pixels of the 2D digital images outside the target area(s) of each object extractor are filtered out so that only the matching points within the target area(s) are preserved. In order to do so, the data points of the SPC are first mapped to pixels in the 2D digital images. The object extractors are then applied to the 2D digital images to filter out pixels not representing the physical object. The pixels of the thus filtered 2D digital images are mapped back to the data points of the SPC and the data points of the SPC that correspond to the filtered-out pixels in the 2D digital images are removed, or nulled, from the SPC. Furthermore, points in other 2D digital images that match points that have been filtered out in one 2D digital image are also removed to ensure consistent modelling.

Aspects of the dense modelling stage will now be disclosed. The input to step 8 is the 2D digital images, as well as the modified SPC generated in Step 7. For Step 8, Step 9,and Step 10, using the SPC as the input, the DPC is generated by 1) image preprocessing for dense modelling, e.g., applying image undistortion, as in Step 8, 2) depth or surface normal estimation, as in Step 9, and 3) combining the 2D digital images with the SPC, as in Step 10. The output of Step 10 is a DPC representing only the physical object of interest (instead of the whole scene).

Figure 6:
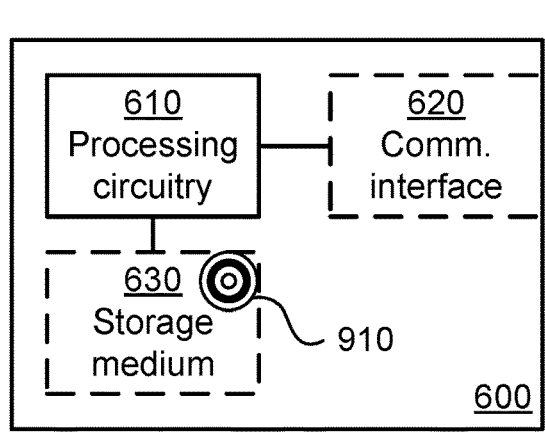
FIG. 6 is a schematic diagram showing functional units of an image processing device according to an embodiment.

FIG. 6 schematically illustrates, in terms of a number of functional units, the components of an image processing device 600 according to an embodiment. Processing circuitry 610 is provided using any combination of one or more of a suitable central processing unit (CPU), multiprocessor, microcontroller, digital signal processor (DSP), etc., capable of executing software instructions stored in a computer program product 910 (as in FIG. 9), e.g. in the form of a storage medium 630. The processing circuitry 610 may further be provided as at least one application specific integrated circuit (ASIC), or field programmable gate array (FPGA).

Particularly, the processing circuitry 610 is configured to cause the image processing device 600 to perform a set of operations, or steps, as disclosed above. For example, the storage medium 630 may store the set of operations, and the processing circuitry 610 may be configured to retrieve the set of operations from the storage medium 630 to cause the image processing device 600 to perform the set of operations. The set of operations may be provided as a set of executable instructions.

Thus the processing circuitry 610 is thereby arranged to execute methods as herein disclosed. The storage medium 630 may also comprise persistent storage, which, for example, can be any single one or combination of magnetic memory, optical memory, solid state memory or even remotely mounted memory. The image processing device 600 may further comprise a communications interface 620 configured for communications with other entities, functions, nodes, and devices. As such the communications interface 620 may comprise one or more transmitters and receivers, comprising analog and digital components for obtaining 2D digital images as input and providing generated DPCs as output. The processing circuitry 610 controls the general operation of the image processing device 600 e.g. by sending data and control signals to the communications interface 620 and the storage medium 630, by receiving data and reports from the communications interface 620, and by retrieving data and instructions from the storage medium 630. Other components, as well as the related functionality, of the image processing device 600 are omitted in order not to obscure the concepts presented herein.

Figure 7:
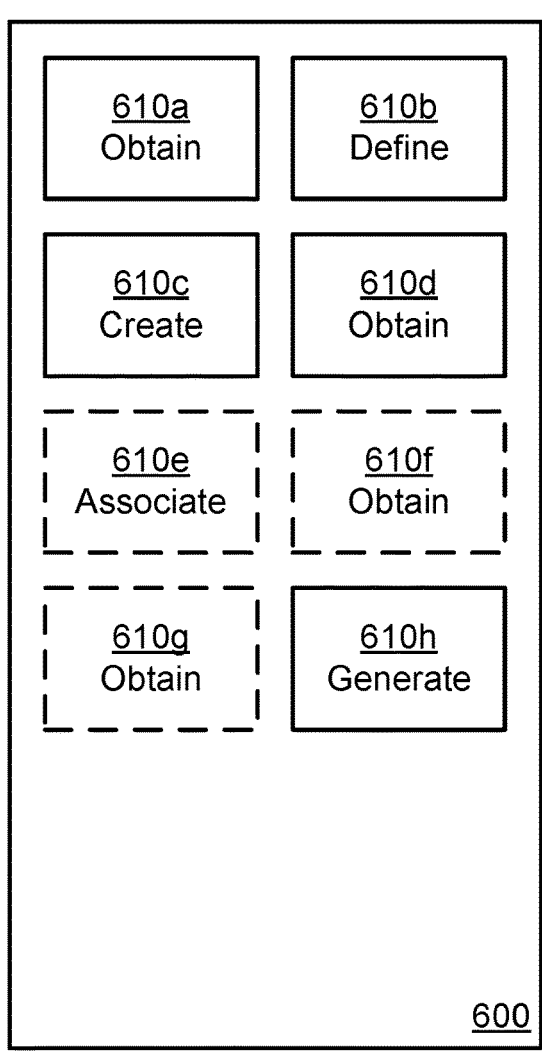
FIG. 7 is a schematic diagram showing functional modules of an image processing device according to an embodiment.

FIG. 7 schematically illustrates, in terms of a number of functional modules, the components of an image processing device 600 according to an embodiment. The image processing device 600 of FIG. 7 comprises a number of functional modules; an obtain module 610a configured to perform step S102, a define module 610b configured to perform step S104, a create module 610c configured to perform step S106, an obtain module 610d configured to perform step S108, and a generate module 610h configured to perform step S110. The image processing device 600 of FIG. 7 may further comprise a number of optional functional modules, such as any of an associate module 610e configured to perform step S108-2, an obtain module 610f configured to perform step S108-4, and an obtain module 610g configured to perform step S108-8. In general terms, each functional module 610a:610h may in one embodiment be implemented only in hardware and in another embodiment with the help of software, i.e., the latter embodiment having computer program instructions stored on the storage medium 630 which when run on the processing circuitry makes the image processing device 600 perform the corresponding steps mentioned above in conjunction with FIG. 7. It should also be mentioned that even though the modules correspond to parts of a computer program, they do not need to be separate modules therein, but the way in which they are implemented in software is dependent on the programming language used. Preferably, one or more or all functional modules 610a:610h may be implemented by the processing circuitry 610, possibly in cooperation with the communications interface 620 and/or the storage medium 630. The processing circuitry 610 may thus be configured to from the storage medium 630 fetch instructions as provided by a functional module 610a:610h and to execute these instructions, thereby performing any steps as disclosed herein.

Any method disclosed herein can be executed by an image processing device 600 implemented at a centralized location, e.g., a computational server in a data center, that has access to 2D digital images from which DPCs are to be generated. The image processing device 600 may be provided as a standalone device or as a part of at least one further device. Alternatively, functionality of the image processing device 600 may be distributed between at least two devices, or nodes. These at least two nodes, or devices, may either be part of the same network part or may be spread between at least two such network parts. Thus, a first portion of the instructions performed by the image processing device 600 may be executed in a first device, and a second portion of the instructions performed by the image processing device 600 may be executed in a second device; the herein disclosed embodiments are not limited to any particular number of devices on which the instructions performed by the image processing device 600 may be executed. Hence, the methods according to the herein disclosed embodiments are suitable to be performed by an image processing device 600 residing in a cloud computational environment. Therefore, although a single processing circuitry 610 is illustrated in FIG. 6 the processing circuitry 610 may be distributed among a plurality of devices, or nodes. The same applies to the functional modules 610*a*: 610*h* of FIG. 7 and the computer program 920 of FIG. 9.

Figure 8:
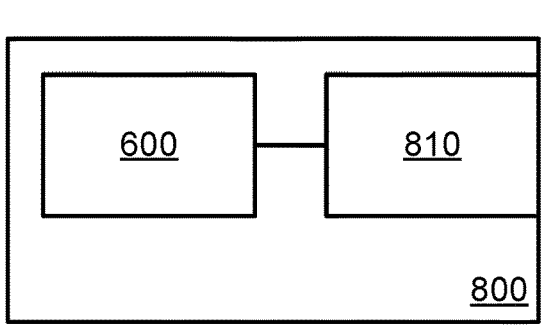
FIG. 8 is a schematic diagram showing a system according to an embodiment.

FIG. 8 schematically illustrates a system 800. The system 800 comprises an image processing device 600 as herein disclosed and configured to perform methods as herein disclosed. The system 800 further comprises an image capturing unit 810 configured to capture the 2D digital images. The system 800 might at least partly reside in a cloud computational environment.

Figure 9:
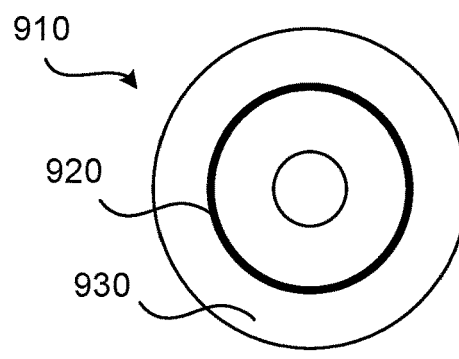
FIG. 9 shows one example of a computer program product comprising computer readable storage medium according to an embodiment.

FIG. 9 shows one example of a computer program product 910 comprising computer-readable storage medium 930. On this computer-readable storage medium 930, a computer program 920 can be stored, which computer program 920 can cause the processing circuitry 610 and thereto operatively coupled entities and devices, such as the communications interface 620 and the storage medium 630, to execute methods according to embodiments described herein. The computer program 920 and/or computer program product 910 may thus provide means for performing any steps as herein disclosed.

In the example of FIG. 9, the computer program product 910 is illustrated as an optical disc, such as a CD (compact disc) or a DVD (digital versatile disc) or a Blu-Ray disc. The computer program product 910 could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 920 is here schematically shown as a track on the depicted optical disk, the computer program 920 can be stored in any way which is suitable for the computer program product 910.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A method for generating a dense point cloud (DPC) of a physical object, the method being performed by an image processing device, the method comprising:

obtaining two-dimensional (2D) digital images of the physical object, wherein each 2D digital image is comprised of pixels, and wherein some, but not all of the pixels in each of the 2D digital images, represent the physical object;

defining object extractors, wherein the object extractors are defined to separate a first set of the pixels in the 2D digital images representing the physical object from a second set of the pixels in the 2D digital images not representing the physical object;

creating a sparse point cloud (SPC) from the 2D digital images, wherein the SPC is comprised of datapoints, and wherein some, but not all of the datapoints, represent the physical object;

obtaining a modified SPC from the SPC by mapping the datapoints of the SPC to pixels in the 2D digital images, applying the object extractors to the 2D digital images to exclude pixels from the 2D digital images, and excluding the mapped datapoints in the SPC that correspond to the pixels that have been excluded from the 2D digital images, whereby the datapoints in the SPC that do not represent the object are excluded from being included in the modified SPC; and generating the DPC by integrating information obtained from the pixels in the 2D digital images with the modified SPC.

2. The method according to claim 1, wherein each datapoint has a value, and wherein the values of the datapoints of the SPC that are excluded are nulled.

3. The method according to claim 1, wherein obtaining the modified SPC further comprises:

associating each 2D digital image with a respective one of the object extractors;

obtaining modified 2D digital images by applying each object extractor to its associated 2D digital image, whereby the pixels of the associated 2D digital images that do not represent the physical object are excluded; and obtaining the modified SPC from the modified 2D digital images by excluding the mapped datapoints in the SPC that correspond to the pixels having been excluded from the 2D digital images.

4. The method according to claim 3, wherein each pixel has a value, and wherein the values of the pixels of the modified 2D digital images that are excluded are nulled.

5. The method according to claim 1, wherein the object extractors are defined by depth maps created from the 2D digital images, and wherein the pixels in the 2D digital images representing the physical object are separated from pixels in the 2D digital images not representing the physical object by a threshold depth value in the depth maps.

6. The method according to claim 1, wherein the object extractors are defined by configuring a machine learning training procedure.

7. The method according to claim 1, wherein each object extractor is represented by a respective binary mask.

8. The method according to claim 1, wherein each of the 2D digital images comprises exchangeable image file format (EXIF) information, and wherein the DPC is generated based on the EXIF information.

9. The method according to claim 1, wherein the 2D digital images are captured from an image capturing unit mounted on an unmanned aerial vehicle, UAV.

10. The method according to claim 1, wherein the physical object is a piece of telecommunications equipment, a part of a cell site, or a complete cell site.

11. The method according to claim 1, wherein the physical object is a building, or part of a building.

12. An image processing device for generating a dense point cloud (DPC) of a physical object, the image processing device comprising processing circuitry, the processing circuitry being configured to cause the image processing device to:

obtain two-dimensional (2D) digital images of the physical object, wherein each 2D digital image is comprised of pixels, and wherein some, but not all of the pixels in each of the 2D digital images, represent the physical object;

define object extractors, wherein the object extractors are defined to separate a first set of the pixels in the 2D digital images representing the physical object from a second set of the pixels in the 2D digital images not representing the physical object;

create a sparse point cloud (SPC) from the 2D digital images, wherein the SPC is comprised of datapoints, and wherein some, but not all of the datapoints, represent the physical object;

obtain a modified SPC by mapping the datapoints of the SPC to pixels in the 2D digital images, applying the object extractors to the 2D digital images to exclude pixels from the 2D digital images, and excluding the mapped datapoints in the SPC that correspond to the pixels that have been excluded from the 2D digital images, whereby the datapoints of the SPC that do not represent the object are excluded from being included in the modified SPC; and generate the DPC by integrating information obtained from the pixels in the 2D digital images with the modified SPC.

13. A computer program product for generating a dense point cloud (DPC) of a physical object, the computer program product comprising a non-transitory computer readable medium storing computer code which, when run on processing circuitry of an image processing device, causes the image processing device to:

obtain two-dimensional (2D) digital images of the physical object, wherein each 2D digital image is comprised of pixels, and wherein some, but not all of the pixels in each of the 2D digital images, represent the physical object;

define object extractors, wherein the object extractors are defined to separate a first set of the pixels in the 2D digital images representing the physical object from a second set of the pixels in the 2D digital images not representing the physical object;

create a sparse point cloud (SPC) from the 2D digital images, wherein the SPC is comprised of datapoints, and wherein some, but not all of the datapoints, represent the physical object;

obtain a modified SPC by mapping the datapoints of the SPC to pixels in the 2D digital images, applying the object extractors to the 2D digital images to exclude pixels from the 2D digital images, and excluding the mapped datapoints in the SPC that correspond to the pixels that have been excluded from the 2D digital images, whereby the datapoints of the SPC that do not represent the object are excluded from being included in the modified SPC; and generate the DPC by integrating information obtained from the pixels in the 2D digital images with the modified SPC.

* * * * *